No. 752,860. PATENTED FEB. 23, 1904.
K. POLIČ & J. MÖDLINGER.
STEAM ENGINE.
APPLICATION FILED MAR. 2, 1903.
NO MODEL.
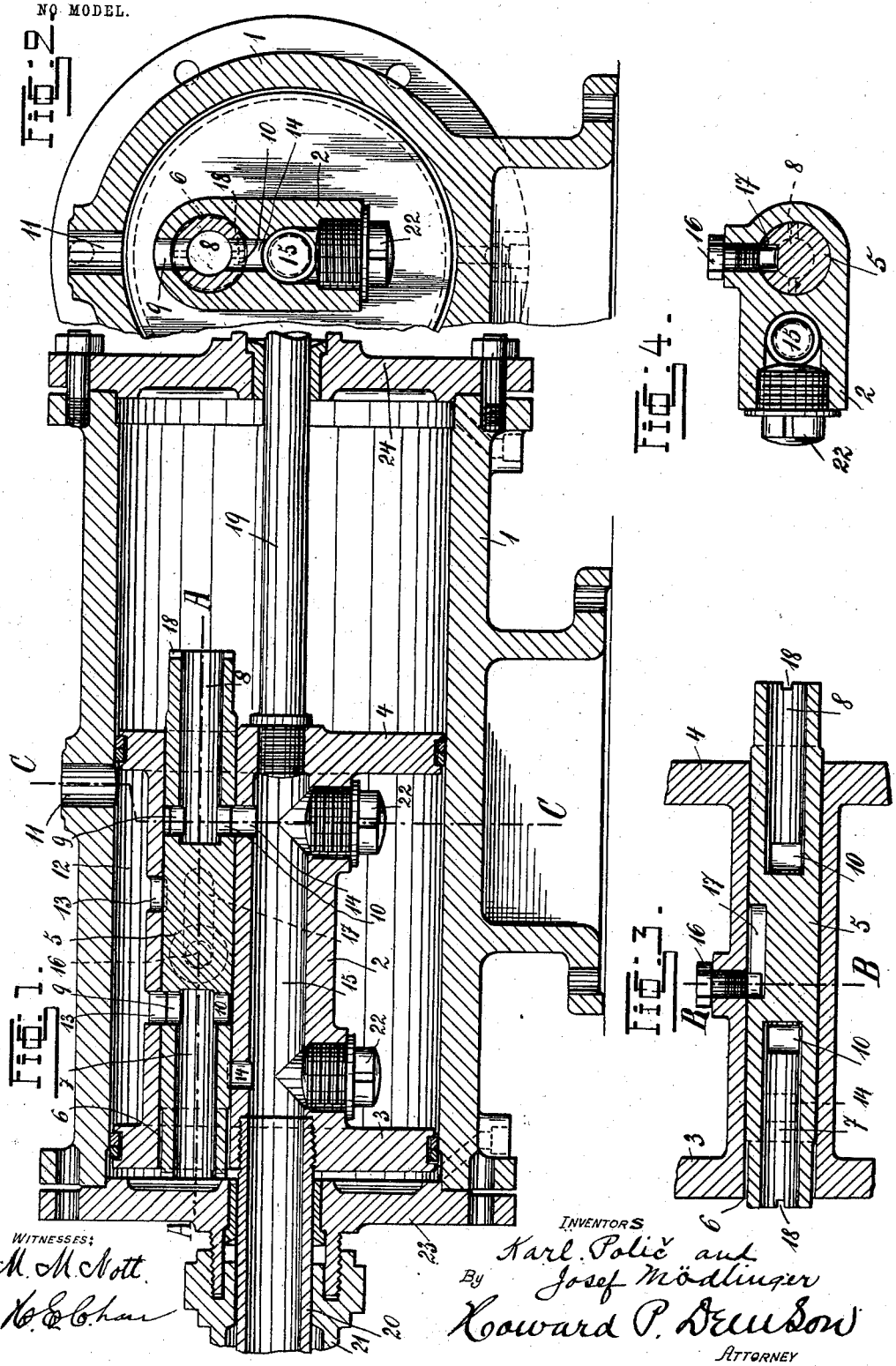
WITNESSES:
M. M. Nott.
H. E. Cohan
INVENTORS
Karl Polič and
Josef Mödlinger
By Howard P. Denison
ATTORNEY No. 752,860. Patented February 23, 1904.

UNITED STATES PATENT OFFICE.

CARL POLIČ AND JOSEF MÖDLINGER, OF BUDAPEST, AUSTRIA-HUNGARY.

STEAM-ENGINE.

SPECIFICATION forming part of Letters Patent No. 752,860, dated February 23, 1904.

Application filed March 2, 1903. Serial No. 145,833. (No model.)

*To all whom it may concern:*

Be it known that we, CARL POLIČ, residing at VII Rottenbiller u. 1, and JOSEF MÖDLINGER, residing at VIII Telekijter 7, Budapest, Austria-Hungary, engineers, citizens of Austria-Hungary, have invented certain new and useful Improvements in Steam-Engines, of which the following is a specification.

Our invention relates to improvements in engines for controlling the distribution of the driving medium—such, for instance, as steam, compressed air, and the like—in the cylinder of an engine, the said engine being contained within the cylinder itself; and the objects of our improvements are, first, to provide a simple and easy method of operating the engine; second, to obtain a valve in which the loss by friction is reduced to a minimum, and, third, to simplify the construction of the cylinder.

In the claims hereto appended the precise improvement will be set out in connection with the accompanying drawings, in which—

Figure 1 is a section through the center of the cylinder of a steam-engine with a valve-gear according to this invention for driving-pumps, crank mechanisms, and the like. Fig. 2 is a transverse section of the cylinder and valve-gear on line C C of Fig. 1. Fig. 3 is a section of the valve through line A A of Fig. 1. Fig. 4 is a section on the line B B of Fig. 3.

Similar letters refer to similar parts throughout the several views.

Referring first to Fig. 1, the casting 3 2 4 constitutes the body of an extended piston, 3 and 4 being piston-blocks, which carry steam-tight packings on their peripheries, and 2 being a hollow connecting-tube closed at one end by the piston-rod 19, but continuing at the opposite end in the form of a hollow guide-rod 20, which while working in a suitable steam-tight gland connects the central hollow space 15 in the piston with the pipe 21, a continuation of which forms the exhaust-pipe of the engine. On one side of the central body 2 is formed a second hollow casting 6, forming the valve-chamber, in which are cut admission-ports 13 13 and exhaust-ports 14 14, connected, respectively, with the outer space 12 and the central hollow space 15 of the piston. The valve 5, which is cylindrical, works in the chamber 6, being guided therein, so as to form a tight joint. It is hollowed out at each end, forming the passages 7 and 8, and provided with inlet-ports 9 9 and exhaust-ports 10 10, which, together with the chamber-ports, connect the cylinder-spaces on each side of the piston with those within the piston. The driving medium (steam, compressed air, or the like) is admitted through an opening 11 in the cylinder-wall, which opens always into the space 12 between the packing-disks of the piston wherever the latter may be in the cylinder and passes thence through the ports 13 into the hollow spaces 7 and 8, then into the cylinder, and from the latter through the openings 14 into the central hollow space 15 of the piston-body when the ports 9 and 10 of the valve coincide with the chamber-ports above mentioned. The valve is prevented from turning by a pin 16 working in a recess 17, (see Figs. 3 and 4,) which also limits the stroke of the valve. Each extremity of the valve is provided with slots 18 for the purpose hereinafter described. The screws 22 close openings in the central body of the piston, which serve to support the core during the casting and afterward to enable the openings 14 to be machined.

In the position shown on the drawings the piston has reached the end of its left-hand stroke, and the valve by striking the cylinder-wall 23 has been moved so that the openings 13 9 on the left-hand side and the openings 10 14 on the right-hand side coincide. Live steam passes, therefore, from the space 12 through the fine slots 18, to the left-hand face of the piston, which is thus caused to start gradually and without shocks, while on the right-hand side of the piston the steam which has done its work is driven away into the hollow space 15 and escapes through the pipe 20 or is led away into a condenser. The piston then starts moving to the right, and toward the end of its stroke the valve strikes the right-hand cover 24 of the cylinder and is thus prevented from moving farther, while the piston continues to move, first, on account of the pressure of the steam, and afterward, when the inlet on the left-hand side and the exhaust on the right-hand side are closed owing to the momentum of the moving parts, this movement eventually admits steam on the right of the piston, and the operation is repeated from right to left, and so on.

At either end the pressure of the valve against the cylinder-covers will have the effect of opening the steam-admission ports slightly before the piston reaches the end of its stroke, and live steam therefore passes through the slots 18 in the extremity of the valve to the rapidly-diminishing cylinder-space, which results in the cushioning of the steam therein, a process which is of considerable importance in effecting the smooth running of an engine. Any desired amount of cushioning can be accurately provided for by the size of the slots 18. The pressure of the initial steam is raised by the cushioning to the full pressure of the incoming steam, and loss of heat is thus prevented. By arranging the respective positions of the ports any desired amount of expansion can be given to the steam by this invention, as in the ordinary slide-valve.

In cylinders of large diameters it is advisable to use several valves of the above construction, which all act in the same way, and thereby reduce the throttling of the steam which might otherwise occur.

What we claim as our invention, and desire to secure by Letters Patent, is—

1. The combination with the cylinder, of a piston operating therein, said piston having its intermediate portion contracted and formed with a central hollow space, and to one side thereof with a chamber, a pair of exhaust-ports which are spaced apart adjacent the opposite ends of said chamber whereby communication is established with said central hollow space, a second pair of ports leading from said chamber and communicating with a space within the cylinder between the enlarged ends of the piston, a valve having its opposite ends provided with hollow spaces, the opposite walls of which are formed with openings adapted to alternately communicate with the adjacent openings of the chamber, the ends of said cylinder being open, and a pipe secured in said piston communicating with the interior thereof and extending to a point without the cylinder.

2. In combination with the cylinder and the piston operating therein, said piston being hollow and having its intermediate portion contracted whereby a chamber is formed exterior thereto and between its ends, a valve slidably mounted in said piston to one side of its center, ports, communicating in the interior of said piston, said valve being formed with ports adapted to alternately aline with the ports communicating with the interior of said piston, ports formed with the outer wall of said chamber, a second series of ports in said valve adapted to alternately communicate with the ports arranged in the outer wall of said chamber, the first-named series of ports of said cylinders being in alinement with their ports when the second-named series of ports are out of alinement with their ports, the ends of said cylinder being open whereby a propelling medium can pass therethrough into engagement with the end walls of the cylinder and operate the valve, substantially as described.

In testimony whereof we have hereunto set our hands in presence of two subscribing witnesses.

CARL POLIČ.
JOSEF MÖDLINGER.

Witnesses:
FRANK DYER CHESTER,
LOUIS VANITORY.